United States Patent [19]

Sjogren

[11] 4,172,368

[45] Oct. 30, 1979

[54] LOCKING ROTATION-TRANSMITTING COUPLING

[75] Inventor: Börje Sjögren, Älvsjö, Sweden

[73] Assignee: Passad Automation AB, Linkoping, Sweden

[21] Appl. No.: 908,803

[22] Filed: May 24, 1978

[30] Foreign Application Priority Data

May 26, 1977 [SE] Sweden ............................... 7706154

[51] Int. Cl.² .......................... F16D 3/06; F16D 3/18
[52] U.S. Cl. ...................................... 64/9 A; 64/23.5; 64/23.6; 64/23.7; 64/14
[58] Field of Search .................. 64/9 A, 14, 23.5, 23.6, 64/23.7

[56] References Cited

U.S. PATENT DOCUMENTS

| | | | |
|---|---|---|---|
| 2,480,039 | 8/1949 | Miller | 64/9 A |
| 2,952,145 | 9/1960 | Thompson | 64/23.7 |
| 4,075,872 | 2/1978 | Geisthoff | 64/23.7 |
| 4,127,309 | 11/1978 | Teramachi | 64/23.7 |
| 4,133,190 | 1/1979 | Schuller | 64/9 A |

FOREIGN PATENT DOCUMENTS

7340694  5/1974  Fed. Rep. of Germany ............ 64/23.7
2736515  2/1978  Fed. Rep. of Germany ............ 64/9 A

*Primary Examiner*—Charles J. Myhre
*Assistant Examiner*—R. C. Turner

[57] ABSTRACT

A locking rotation-transmitting coupling comprises a nonrotatable member providing a housing having a cylindrical bore surface; a driven member having a hub portion that is, in cross-section, a regular polygon concentric to the bore axis, with axially extending sides that oppose and are radially spaced from the bore surface; and a driving member having axially extending fingers in the space between the bore surface and the hub portion, there being as many fingers as there are sides of the polygon, and the fingers being equidistant from said axis and spaced at uniform circumferential intervals. Two identical roller elements are confined in each space between circumferentially adjacent fingers. Every roller element is in contact with both the bore surface and one of the side surfaces on the hub portion, for preventing rotation of the driven member when no torque is applied to the driving member, and is also in contact with one of said fingers and the other roller element of its pair for transferring torque from the driving member to the driven member.

5 Claims, 4 Drawing Figures

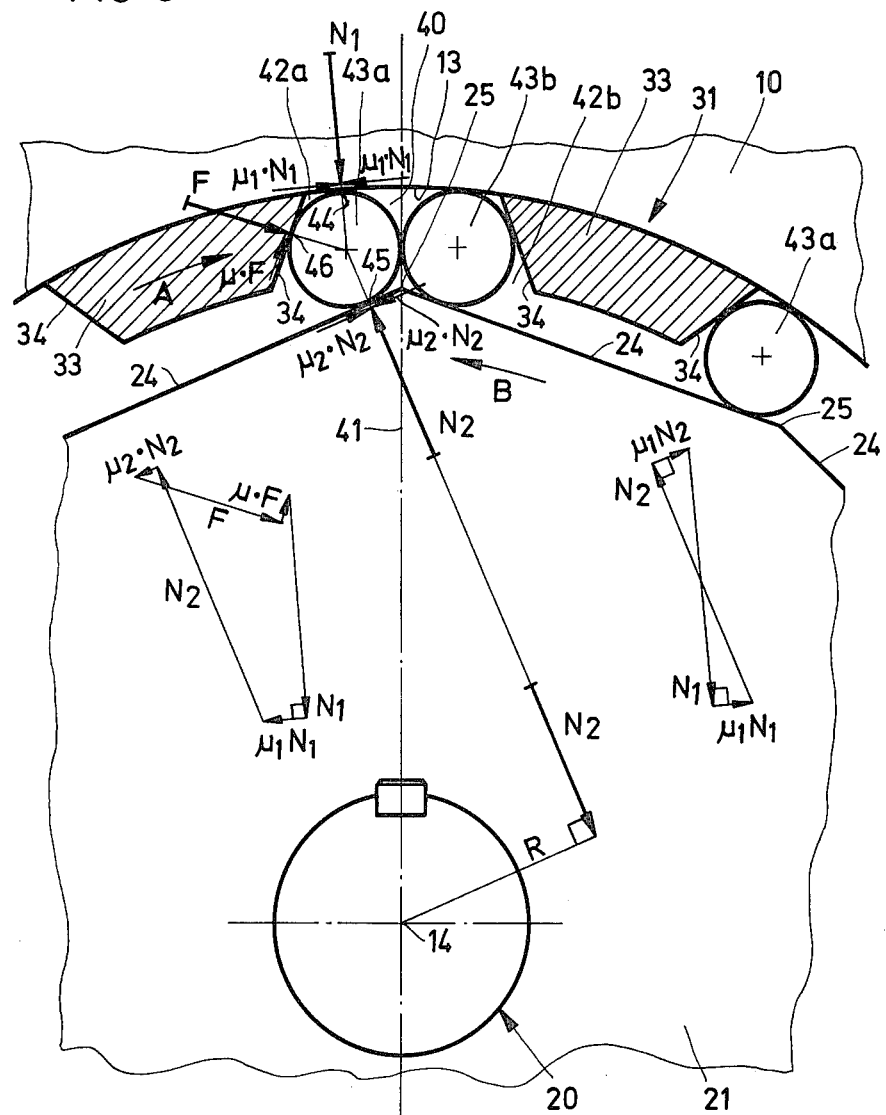
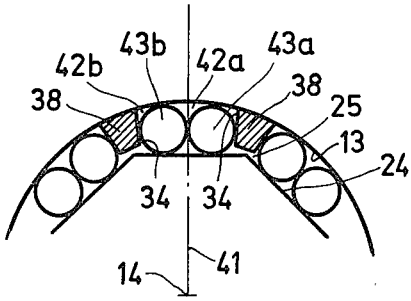

LOCKING ROTATION-TRANSMITTING COUPLING

This invention relates to locking rotation-transmitting couplings of the type comprising a non-rotatable member that provides a housing, a driving member having a portion which is coaxially rotatable within the housing, and a coaxial driven member which also has a portion located within the housing and which is constrained to rotate with the driving member but is normally locked to the nonrotatable member and is thus confined against rotation when no torque is being applied to the driving member. More specifically, the invention relates to an improved locking coupling having no play or backlash between its driving member and its driven member, so that the rotational position in which the driven member is established always corresponds exactly to the rotational position to which the driving member is adjusted.

A locking rotation-transmitting coupling of the type to which this invention relates is useful, for example, for controlling the position of a large globe valve in a high pressure fluid system. Pressure of fluid in the system tends to alter the position of the valve, and therefore the valve must be normally restrained against movement out of any rotational position to which it may be adjusted; but from time to time its rotational position must be altered and at each such alteration it should be possible to establish the valve very accurately in a new position. When a locking rotation-transmitting coupling is used with such a valve, the driven member of the coupling is connected with the valve and the driving member may be manually rotatable or may be actuated by means of a mechanical servo in an automatic control system. In cases where the coupling is used in a control system that requires precise valve adjustments for the maintenance of critical values, the importance of avoiding play or backlash between the driving and driven members of the coupling will be apparent.

Locking rotation-transmitting couplings of the general type to which this invention relates have been known and used for a long time, and many variants have been produced. In all such couplings that have gone into general use, roller elements have been arranged to so cooperate with the driven member and the nonrotatable member that the driven member was confined against rotation when no torque was being applied to the driving member. In the construction that has heretofore been usual, the roller elements have been arranged in pairs, and springs or the like have been interposed between the roller elements of each pair to serve as elastic spacers whereby the elements were normally maintained in frictional locking engagement with the nonrotatable member and the driven member. Application of torque to the driving member effected a compression of the elastic spacers that permitted the roller elements to be released from their locking engagement and allowed circumferentially facing abutments on the driving member to move into torque transmitting engagement with opposing abutments on the driven member.

An arrangement of the type just described is disclosed in West German Pat. No. 1,284,135, published in November, 1968. In the coupling of that prior patent, and in others generally like it, play between the driving member and the driven member was not only unavoidable but was in fact essential to operation, because a certain amount of relative rotation between the driving member and the driven member was relied upon to effect a movement of the roller elements out of, and back into, locking relationship with the driven member and the nonrotatable member. It is noteworthy that in such prior couplings the roller elements served only for restraining rotation and had to be rendered ineffectual when rotation was to be imparted to the driven member, while on the other hand the cooperating abutments on the driving and driven members served only to transmit rotation from the driving member to the driven member and performed no rotation restraining function.

In addition to the undesirable play and backlash that was made inevitable by the elastic spacers in prior locking couplings, the very presence of those elastic spacers was in itself a disadvantage. They complicated manufacture and made the coupling more expensive. They took up a certain amount of space and thus caused the coupling to be relatively bulky. And they diminished the reliability of the coupling because if they relaxed or broke, the coupling either could not lock or could not unlock.

With the disadvantages of prior locking couplings in mind, the general object of the present invention is to provide a greatly improved locking coupling that has no backlash or loose play between its driving member and its driven member and—having no springs or other elastic elements—is more compact, more reliable and less complicated than prior locking couplings.

A specific object of this invention is to provide a locking rotation-transmitting coupling of the type comprising a nonrotatable member that provides a housing having a cylindrical inner wall surface, a driving member having a portion coaxially rotatable within that housing, a driven member which also has a portion coaxially rotatable within said housing, and a plurality of roller elements that can be either balls or cylindrical rollers, wherein the roller elements cooperate with the non-rotatable member and with the driven member to confine the latter against rotation when no torque is being applied to the driving member, and also cooperate with the driving member and the driven member to transmit to the driven member all torque applied to the driving member.

Another specific object of this invention is to provide a locking coupling which achieves the last stated object by virtue of the geometry of the portions of its driving and driven members that are located within said housing, whereby the roller elements are at all times maintained in force transmitting engagement with the driven member and whereby the roller elements are normally also maintained in frictional engagement with the inner cylindrical wall surface of the non-rotatable member but are released from such frictional engagement by a slight rotation of the driving member which simultaneously causes the rollers to be employed for transmitting torque from the driving member to the driven member.

It is also a specific object of this invention to provide a locking rotation-transmitting coupling which achieves the several objects set forth above but which can nevertheless be manufactured without the need for unusual or costly tooling or other equipment and can be quickly and easily assembled.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which:

FIG. 3 is a fragmentary view on an enlarged scale, corresponding to a portion of FIG. 2 and illustrating certain force relationships in a locking rotation-transmitting coupling of this invention; and FIG. 4 is a more or less diagrammatic view generally similar to FIG. 3 but illustrating a modified embodiment of the invention.

Figure 1:
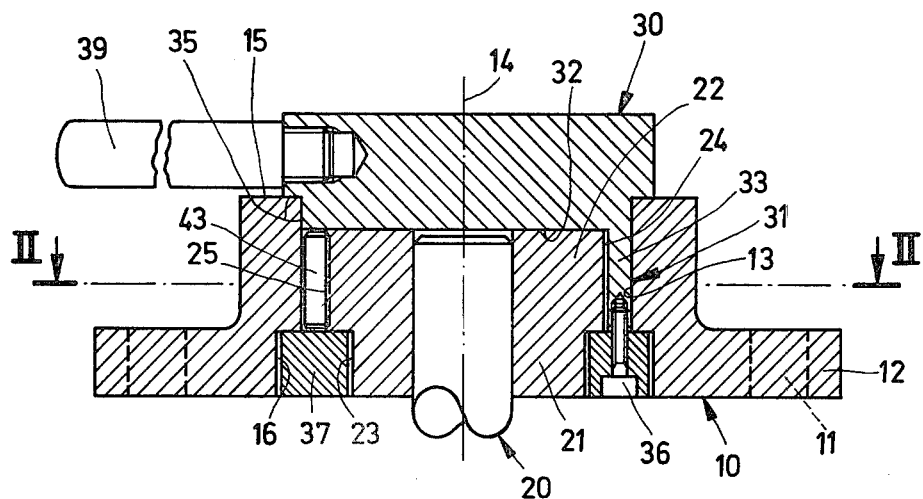
FIG. 1 is a view in axial section of a locking rotation-transmitting coupling embodying the principles of this invention, taken on the plane of the line I—I in FIG. 2.

Referring now to the accompanying drawings, a locking rotation-transmitting coupling embodying the principles of this invention comprises, in general, a nonrotatable member 10 in the form of a sleeve-like housing having an inner cylindrical surface 13, a driven member 20 that is constrained to rotation about the axis 14 of said cylindrical surface and is in part disposed within said housing, a driving member 30 which is likewise coaxially rotatable about the axis 14 and which also has a part within said housing, and a plurality of identical roller elements 43 that cooperate with all three of the members 10, 20 and 30.

The sleeve-like housing that comprises the nonrotatable member 10 is intended to be fastened to a stationary part (not shown) of a machine on which the coupling is installed, and therefore one end of the housing can have a flange 12 in which there are bolt holes 11 that provide for such securement. Since the cylindrical bore surface 13 in the housing constitutes a working surface that is subjected to rather high and localized forces, the nonrotatable member should be made of hard, wear resistant material or—as is preferable from a cost standpoint—it can have a body of a less expensive material such as cast iron, into which is shrunk a liner of alloy steel or the like that defines the cylindrical inner surface 13.

The bore surface 13 opens at one end to a coaxial counterbore 16 that defines a circumferential recess in one end of the nonrotatable member. As shown, the counterbore 16 and the flange 12 are at the same end of the housing, and that end of it can be regarded as its rear end.

The driven member 20 is illustrated as comprising a hub 21 that is wholly within the housing and to which the front end of a shaft is keyed for connecting the hub with a rotatably adjustable machine element (not shown). The shaft projects rearwardly beyond the nonrotatable member 10 and can be confined to rotation by means of a suitable bearing or bearings (not shown) located behind the nonrotatable member. Both the hub 21 and the shaft of the driven member are concentric to the axis 14 of the bore 13 in the housing.

The front portion 22 of the hub 21 has a regular polygonal cross-section, but its rear portion is circular and of smaller diameter, to define a concentric cylindrical surface 23 that opposes the radially inwardly facing surface of the counterbore 16 in the housing.

The polygonal front portion 22 of the hub has a uniform cross-section along its length, and its several identical side surfaces 24, which extend parallel to the bore axis 14, oppose the bore surface 13 and are spaced radially from that surface by a substantial distance.

The side surfaces 24 of the polygonal front hub portion 22 can be ground or milled as flat facets, as shown, but they could be slightly convex as viewed from the ends of the hub, or they could meet at slightly rounded corners 25.

The driving member 30 has an actuator portion which is disposed in front of the nonrotatable member 10, illustrated as comprising a laterally projecting handle 39 by which rotation can be manually imparted to the driving member. The portions of the driving member that are behind its actuator portion have a close rotatable fit in the housing bore 13 so that the driving member is guided for coaxial rotation by its cooperation with the nonrotatable member. Directly behind its actuator portion the driving member has a plug-like intermediate portion which projects a short distance into the front end portion of the housing bore 13 to close the same and on which there is a flat, axially rearwardly facing surface 32 that abuts the flat front surface of the driven member hub 21.

Extending rearwardly from the intermediate portion of the driving member, and located in the space between the hub 21 and the bore surface 13, the driving member has a portion 31 which can be regarded as more or less tubular, with an inside diameter somewhat greater than the maximum diameter of the polygonal front portion 22 of the hub 21. However, this rear portion of the driving member, instead of being truly tubular, is circumferentially interrupted by axially extending slots along its length that define a plurality of identical fingers 33. There are as many fingers 33 as there are sides on the regular polygon defined by the cross-section of the front portion 22 of the hub 21, and the fingers are circumferentially spaced apart by uniform distances as well as equidistant from the axis 14 of the housing bore 13. Furthermore, every finger is of uniform cross-section all along its length, which is to say that the axially extending slot between each pair of circumferentially adjacent fingers 33 is of uniform width along its length and can therefore be formed by a milling operation.

The space between each pair of circumferentially adjacent fingers 33, conjointly defined by those fingers, the bore surface 13 and the polygonal hub portion 22, constitutes a pocket or chamber 40 wherein two roller elements 43 are confined. The roller elements 43 are preferably cylindrical rollers, as illustrated, but they could be balls, in which case the fingers 33 would have a lesser axial length than as shown in FIG. 1.

The roller elements 43, the driven member 20 and the driving member 30 are maintained assembled with one another and with the nonrotatable housing member 10 by means of a ring 37 of rectangular cross-section that is received in the annular recess conjointly defined by the counterbore 16 in the housing member and the reduced diameter cylindrical portion 23 on the rear of the hub. The ring 37 is secured to the driving member 30 by means of screws 36 which extend forwardly through the ring and are received in rearwardly opening threaded holes in the rear ends of the fingers 33. The flat front surface of the ring 37 overlies the coplanar rearwardly facing surfaces defined by the counterbore 16 and the reduced diameter cylindrical portion 23 at the rear of the hub, and the ring thus cooperates with the front actuator portion of the driving member 30, which overlies a flat front surface 15 on the nonrotatable member, to confine the driving member against axial displacement relative to the nonrotatable member. In turn, the driven member hub 21 is axially confined between the ring 37 and the flat rear surface 32 on the driving member. The front ends of the slots between the fingers 33 are coplanar with the surface 32 on the driving member, and the roller elements 43 are almost as long as the fingers; hence each roller element can have only limited axial motion between the surface 32 and the ring 37.

As best seen in FIG. 3, the dimensions of the several parts are such that every roller element 43 is always in contact with another roller element, with one of the fingers 33, with the housing bore surface 13, and with one of the axially extending side surfaces 24 on the polygonal front portion 22 of the driven member hub 21. Cylindrical roller elements are preferred so that all of these contacts will be line contacts rather than the point contacts that would be obtained with balls. The geometry of the several parts, and particularly of the fingers 33 and of the polygonal hub portion 22, enables the roller elements to cooperate in a novel manner with the nonrotatable member 10, the driven member 20, and the driving member 30.

The slots between fingers 33 are so formed that each finger has a pair of opposite axially extending flat surfaces 34 that face generally in circumferential directions and can be regarded as driving surfaces because of the manner in which they cooperate with adjacent roller elements 43. The two opposing driving surfaces 34 at opposite sides of each pocket 40 are symmetrical to a radial plane 41 that contains the axis 14 and the point of contact between the two identical roller elements 33 in the pocket, and the pocket 40 is also symmetrical to that plane. In the preferred embodiment of the invention, illustrated in FIGS. 1-3, each of the pockets 40 is located just radially outwardly of a hub corner 25, and the plane 41 to which it is symmetrical bisects the angle made by the polygon surfaces 24 which meet at that corner. Thus the portions of the pocket 40 that are at opposite sides of the plane 41 diverge away from that plane, and the two roller elements 43 in the pocket are respectively in contact with different side surfaces 24 of the polygonal hub portion 22. In the embodiment of the invention illustrated in FIG. 4, the fingers 38 are located opposite the corners 25 of the polygonal hub portion, and both of the roller elements 43a, 43b in each pocket contact the same side surface of the polygonal hub portion.

The operation of the coupling will now be described with particular reference to FIG. 3, which illustrates the preferred arrangement.

When a clockwise torque is applied to the driving member, as denoted by the arrow A, each finger 33, through its driving surface 34 that faces in the direction of the torque force, imposes upon its adjacent roller element 43a a force F. That force is of course applied at the axially extending line of contact 46 between the driving surface and the roller element, and it is exerted in a direction normal to the driving surface. It tends to urge the roller element towards the hub surface 24, which the roller element contacts along the line 45, and also towards the bore surface 13, which the roller element contacts along the line 44. The force which the roller element imposes upon the bore surface 13 is opposed by an equal and opposite force $N_1$, acting on the roller element along the line of contact 44 and directed radially to the bore surface; and there is likewise a reaction force $N_2$ against the roller element from the hub surface 24, acting along the line of contact 45 and in the direction normal to that surface. The reaction to the force $N_2$ is an equal and opposite force acting on the hub at a radius vector R. The torque transferred to the hub from the driving member thus depends partly upon the magnitude of the force $N_2$ and partly upon the length of R. The length of R is a function of the diameter of the polygon and the number of sides that it has. The force $N_2$ is the utilized force that is obtained when friction components $\mu F$, $\mu_1 \cdot N_1$ and $\mu_2 \cdot N_2$ at the respective lines of contact 46, 44 and 45 are taken into account, the resolution of forces during the motion condition being as shown in the left-hand force diagram in FIG. 3.

Figure 2:
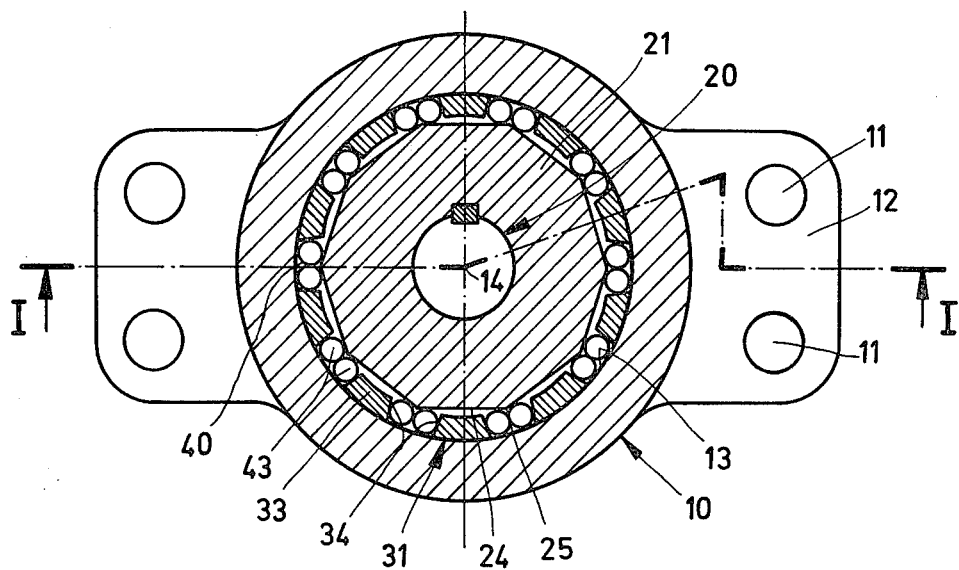
FIG. 2 is a view of the coupling in cross-section, on the plane of the line II—II in FIG. 1.

It will be seen that it is the friction component $\mu_1 \cdot N_1$ at the bore surface 13 that has the greatest effect in reducing $N_2$. However, if the driving surfaces 34 on circumferentially adjacent fingers are mutually inclined to one another as shown in FIG. 3, rather than being substantially parallel to one another as shown in FIGS. 2 and 4, the magnitude of the useful component of the force F is thereby increased, the relationship between the normal forces $N_1$ and $N_2$ is improved, and the transmitted torque $N_2 R$ is correspondingly increased. With the preferred orientation of driving surfaces 34 that is shown in FIG. 3, opposing driving surfaces on circumferentially adjacent fingers diverge substantially from one another in the direction towards the bore axis, said surfaces being inclined at opposite oblique angles to the plane 41 that lies midway between them and contains the axis 14. As a simplified explanation it can be said that with the driving surfaces 34 so inclined, the application of torque to the driving member 30 causes each driving surface that faces generally in the direction in which the torque is exerted to impose upon the roller element 43 in contact with it a force that has a substantially radially inward component, whereby that roller element is urged away from the bore surface 13.

When torque is applied to the driving member, the coupling parts undergo a certain amount of elastic deformation, caused by the wedging action of the force-transmitting roller elements 43a against the working surfaces, i.e., the hub surfaces 24 and the bore surface 13. As a result of this elastic deformation, there is some increase in the radial dimensions of the pocket portions 42a and 42b. The inactive roller elements 43b are consequently moved by the driving roller elements 43a in the circumferential direction of the applied torque and are thus released from any wedging cooperation they may have had with the working surfaces so that they are free to move with their adjacent force transmitting roller elements 43a. Simultaneously, there is an increase in the contact forces $N_1$ and $N_2$ exerted by and upon the driving roller elements 43a, and when the resultant torque $N_2 R$ becomes large enough to exceed the external forces acting on the driven member 20, the hub and all of the roller elements are set into motion along the working surface 13 of the housing. In this way the driven member 20 can be accurately moved to any desired rotational position by rotating the driving member 30 to an exactly corresponding position, there being no loose play or backlash between the driving and driven members.

When the driven member 20 is in any rotational position and an external torque force is applied directly to it (not through the driving member 30), its motion in response to such force is prevented by the roller elements in their cooperation with the working surfaces 24 and 13 on the hub and the housing. Assume, for example, that a counterclockwise force is imposed upon the driven member as denoted by the arrow B in FIG. 3. Due to the wedging effect of the roller element 43a in its cooperation with the working surfaces 13 and 24 in its pocket portion 42a, forces $N_1$ and $N_2$ will arise that are, respectively, normal to those surfaces; and the friction forces $\mu_1 \cdot N_1$ and $\mu_2 \cdot N_2$, previously operating in the opposite direction, will balance out as shown in the right-hand force diagram in FIG. 3. Since the angle between the normal forces, i.e., the wedging angle between the working surfaces in the pocket portion 42, is less than the friction angle for the materials employed, there can be no sliding, and the normal forces are directly proportional to the torque applied from the driven member hub 21, so that its rotation is prevented. If the external force imposed directly upon the hub 21 urges it towards motion in the direction opposite to the arrow B, the roller elements 43a will then be the ones that produce the wedging effect that prevents such motion.

In the FIG. 4 embodiment of the invention, each pocket between a pair of fingers 38 can be regarded as two wedge-shaped spaces that taper away from one another, instead of a pair of wedge-shaped spaces that taper towards one another as in FIG. 3. The operation of the FIG. 4 embodiment is similar to that of the form of the invention illustrated in FIGS. 1–3, except that when the hub is being rotatably driven from the driving member in the FIG. 4 embodiment, force is transmitted from the driving surface 34 on each finger 38, through the roller element in contact therewith and through its adjacent roller element, and from the latter to the hub.

From the foregoing description taken with the accompanying drawings, it will be apparent that this invention provides a locking rotation-transmitting coupling that is simple, reliable and inexpensive and has the further very important advantage that the driven member fully partakes of all rotation of the driving member, with no play or backlash between the driving and driven members.

Those skilled in the art will appreciate that the invention can be embodied in forms other than as herein disclosed for purposes of illustration.

The invention is defined by the following claims.

I claim:

1. A locking rotation-transmitting coupling of the type comprising a nonrotatable member that has an inner cylindrical surface which is concentric to an axis, a driving member concentric to said axis and rotatable about the same, a driven member which can be concentrically rotated about said axis by torque transmitted thereto from the driving member, and a plurality of substantially identical roller elements which cooperate with the nonrotatable member and the driven member to confine the driven member against rotation when no torque is being applied to the driving member, said coupling being characterized by:

A. the driven member having a portion which is, in cross-section, substantially a regular polygon concentric to said axis, said polygonal portion having axially extending, radially outwardly facing side surfaces that oppose and are radially spaced from said inner cylindrical surface of the nonrotatable member;

B. the driving member having a plurality of substantially identical axially extending fingers that are equidistant from said axis and circumferentially spaced apart at uniform intervals, (1) there being as many of said fingers as there are sides of said polygon, (2) said fingers being located in the space between said inner cylindrical surface and said polygonal portion of the driven member, and (3) each of said fingers having a pair of opposite axially extending driving surfaces that face in generally circumferential directions, the opposing driving surfaces on circumferentially adjacent fingers cooperating with said inner cylindrical surface and said side surfaces on the driven member to define a plurality of pockets; and C. there being a pair of said roller elements in each of said pockets, (1) every roller element being confined between and in contact with one of said side surfaces and said inner cylindrical surface so that the roller elements can cooperate with the nonrotatable member and the driven member to confine the driven member against rotation when no torque is being applied to the driving member, and (2) every roller element also being confined between and in contact with the other roller element of its pair and a driving surface on one of said fingers, so that the roller elements can cooperate with the driving member and the driven member to transfer torque from the former to the latter without play or backlash between those members.

2. The locking rotation-transmitting coupling of claim 1, further characterized by:

the opposing driving surfaces on circumferentially adjacent fingers being divergent in the direction towards said axis, so that upon rotation of the driving member every driving surface facing in the direction of rotation can impose upon the roller element in contact with it a force that has a radially inward component whereby friction between that roller element and said cylindrical surface is decreased.

3. A locking rotation-transmitting coupling of the type comprising a nonrotatable member that has a cylindrical surface which is concentric to an axis and faces in one radial direction, a driving member concentric to said axis and rotatable about the same, a driven member which can be rotated about said axis by torque transmitted thereto from the driving member, and a plurality of substantially identical roller elements which cooperate with the nonrotatable member and the driven member to confine the driven member against rotation when no torque is being applied to the driving member, said coupling being characterized by:

A. the driven member having a portion which is, in cross-section, substantially regularly polygonal and concentric to said axis, said polygonal portion having axially extending substantially flat surfaces which radially oppose and are radially spaced from said cylindrical surface on the nonrotatable member;

B. the driving member having a plurality of substantially identical axially extending fingers that are equidistant from said axis and circumferentially spaced apart at uniform intervals, (1) there being as many of said fingers as there are sides of said polygon, (2) said fingers being located in the space between said cylindrical surface and said polygonal portion of the driven member, and (3) each of said fingers having a pair of opposite axially extending driving surfaces that face in generally circumferential directions, the opposing driving surfaces on circumferentially adjacent fingers cooperating with said cylindrical surface and said substantially flat surfaces on the driven member to define a plurality of pockets; and C. there being a pair of roller elements in each of said pockets, (1) every roller element being confined between and in contact with one of said substantially flat surfaces and said cylindrical surface so that the roller elements can cooperate with the nonrotatable member and the driven member to confine the driven member against rotation when no torque is being applied to the driving member; and (2) every roller element also being confined between and in contact with the other roller element of its pair and a driving surface on one of said fingers, so that the roller elements can cooperate with the driving member and the driven member to transfer torque from the former to the latter without play or backlash between those members.

4. The locking rotation transmitting coupling of claim 3 wherein said cylindrical surface faces radially inwardly and said substantially flat surfaces face radially outwardly.

5. The locking rotation transmitting coupling of claim 3, further characterized by:

the opposing driving surfaces on circumferentially adjacent fingers being convergent in the radial direction towards said cylindrical surface so that upon rotation of the driving member every driving surface facing in the direction of rotation can impose upon the roller element in contact with it a force that has a component in the radial direction away from said cylindrical surface, whereby friction between that roller element and said cylindrical surface is decreased.

* * * * *